United States Patent

Bogenberger et al.

[15] 3,691,533

[45] Sept. 12, 1972

[54] ELECTROCHEMICAL DATA STORAGE WITH ELECTRON BEAM ACCESSING

[72] Inventors: Richard Bogenberger, Oberneuching; Conrad Helmcke, Munich-Perlach; Athanasios Kritikos; Walter Kroy, both of Munich; Walter E. Mehnert, Ottobrunn, all of Germany

[73] Assignee: Messerschmitt-Bolkow-Blohm GmbH, Munich, Germany

[22] Filed: April 20, 1970

[21] Appl. No.: 29,828

[30] Foreign Application Priority Data

May 23, 1969 Germany..........P 19 26 529.3

[52] U.S. Cl.......340/173 CH, 340/173 CR, 307/279, 313/68

[51] Int. Cl..........................G11c 13/02, G11c 11/00

[58] Field of Search....340/173 CR, 173 CH, 173 SS; 307/279; 317/235; 313/68

[56] References Cited

UNITED STATES PATENTS

| | | | |
|---|---|---|---|
| 3,506,971 | 4/1970 | Sakurai | 340/173 CR |
| 3,401,294 | 7/1968 | Cricchi et al. | 340/173 CR |
| 3,418,640 | 12/1968 | Werner | 340/173 CR |
| 3,483,414 | 12/1969 | Kazan | 313/68 |
| 3,530,441 | 9/1970 | Ovshinsky | 340/173 SS |
| 3,528,064 | 9/1970 | Everhart et al. | 340/173 SS |
| 3,509,544 | 4/1970 | Choisser | 340/173 CH |
| 3,439,174 | 4/1969 | Snaper | 340/173 CH |
| 3,158,798 | 11/1964 | Sauder | 340/173 CH |

*Primary Examiner*—Eugene G. Botz
*Assistant Examiner*—James F. Gottman
*Attorney*—Woodhams, Blanchard and Flynn

[57] ABSTRACT

Storage element for information using electrochemical means. Multiple, polarizable storage electrodes are provided and arranged spaced from and opposed to a nonpolarizable counterelectrode, all the electrodes being arranged within a chamber containing an electrolyte. Information is recorded onto the polarizable electrodes in a desired pattern by causing an electron beam to impinge thereon through a junction contact. Information is digitally obtained by directing the electron beam to selected locations which develops a voltage between one of the storage electrodes and the counterelectrode the magnitude of which depends upon the state of polarization of the storage electrode. Such voltage is then measured by an auxiliary electrode and delivered as an output.

6 Claims, 4 Drawing Figures

INVENTORS
RICHARD BOGENBERGER
CONRAD HELMCKE
ATHANASIOS KRITIKOS
WALTER KROY
WALTER E. MEHNERT
BY Wardhams, Blanchard & Flynn
ATTORNEYS

ELECTROCHEMICAL DATA STORAGE WITH ELECTRON BEAM ACCESSING

The invention relates to a storage element for the storage of large quantities of information using electrochemical methods.

Among other methods and means previously known for this purpose, a procedure and an arrangement for the realization of this procedure have been developed which permit storage through reversible generation of a polarizing hydrogen or oxygen skin on two electrodes of the same material, located in an electrolyte and forming a storage element by means of a voltage pulse which is applied to both electrodes and does not cause chemical electrode reversal. The electrodes of *n* storage elements are in each case combined into one rodlike electrode. But even this storage arrangement does not achieve extremely short acceptance times.

The objective of the invention is to provide a memory which permits storage of large amounts of information within the smallest possible space and whose acceptance times are extremely short, viz, approximately $10^{-8}$ sec.

The invention achieves this by providing that a number of polarizable storage electrodes have a common, nonpolarizable counter electrode for energy supply, that one auxiliary electrode, also not polarizable, be used for information seeking, and that a controllable junction contact be provided for reversing the external source and the discharge lines of the storage electrodes. This arrangement in accordance with the invention is characterized by its notable simplicity, mechanical stability and by the fact that it permits high signal voltages.

It is also suggested that the controllable junction contact consist of a highly conductive layer, e.g., silver-and a homogeneous or mosaic semi-conductive layer with a storage element arrangement.

The invention proposes as a further development that the controllable junction contact consist of a highly-conductive layer, e.g., silver, one or more highly insulating layer(s), e.g., metal oxides, and highly pure undoped semiconductor layers, e.g., silicon, one layer containing a number of basic elements insulated from each other so that a single element forms a so-called metal oxide silicon field-effect transistor (MOSFET).

According to the invention this arrangement makes it possible to establish a system consisting of a great number of operating electrodes to which only one counterelectrode and one reference electrode are assigned. Another advantage results from the fact that each operating electrode can be adjusted to three different conditions viz, positive, zero, and negative.

Other additional features and advantages of this invention will become apparent through reference to the following description and to the accompanying drawing, in which.

Figure 1:
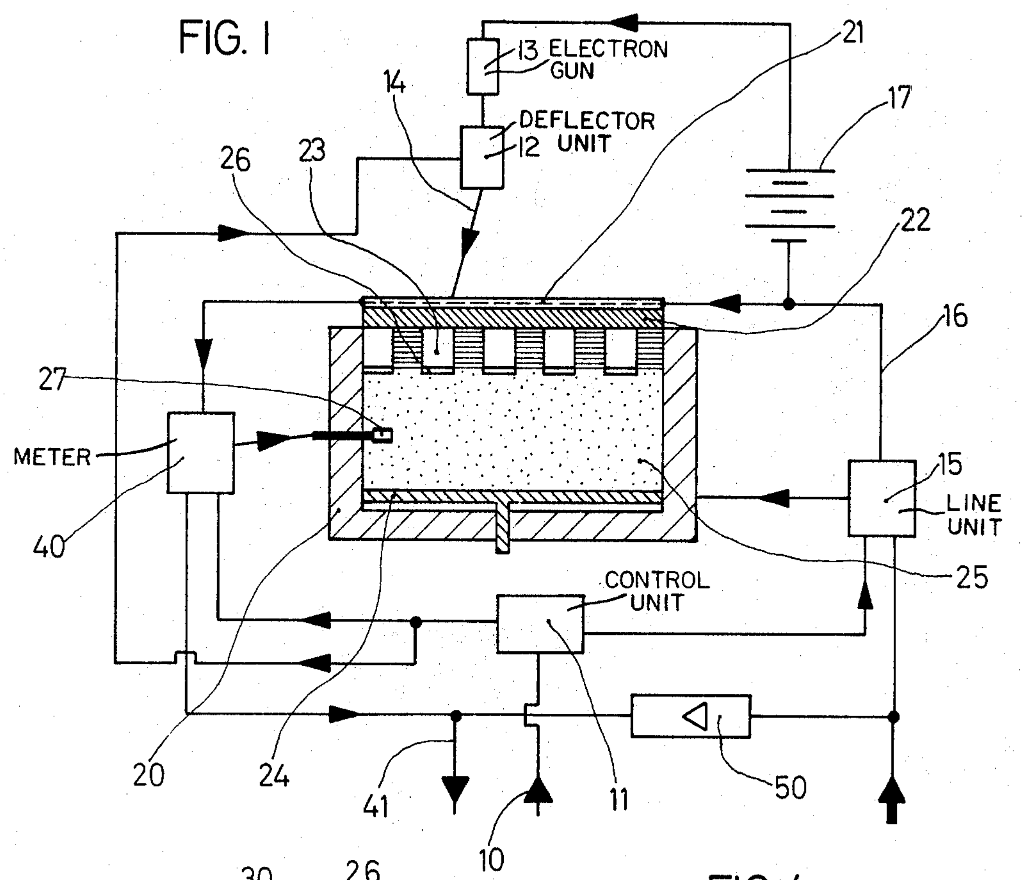
FIG. 1 shows a block diagram of the arrangement according to the invention.
Figure 2:
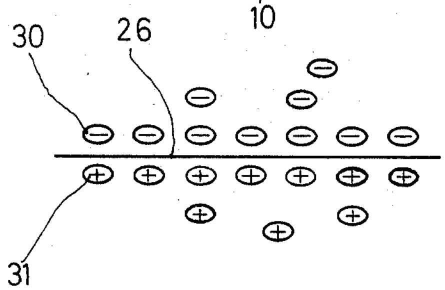
FIG. 2 shows a schematic view of the formation of an electronic double layer on the operating electrodes.

A selected item of information 10 coming from an external information transmitter, e.g., a computer, is fed to control unit 11 (FIG. 1). By means of a deflector unit 12 this control unit 11 directs the electron beam 14 emitted by the electron gun 13, which is powered by a battery 17, to that part of the memory which is correlated to the input information. The electrons which partially penetrate the conductor layer 21 cause the semiconductor or insulator layer 22 to become conductive at this particular site. The information fed from the external unit to the line unit 15, e.g., zero or one, generates a current flowing through line 16 into the conductor layer 21 which constitutes a so-called junction contact, from there into the insulating layer 22 which has become conductive at this site and then into the polarizable storage electrode 23. The charge flowing off on the counter electrode 24 creates an electric double layer 30, 31 on surface 26 facing the electrolyte 25 in a container 20, as is shown in FIGS. 1 and 2. Due to the polarizing ability of electrode 23 a transfer of the charge between the electrolyte phase and the electrode phase and vice versa is impossible.

Depending on the direction of the current flowing from the line unit 15, electrode 23 is polarized with different signs, so that three qualitatively different storage conditions are created. These conditions are: positive polarization, negative polarization, and no polarization. The polarization state prevailing in each case is then maintained over a certain period of time and gradually reduced through Redox processes. Through an appropriate selection of the electrolyte 25, the storage material, temperature and pressure, this storage time can be greatly increased, so that periods of several hours can be achieved. At the end of a certain period of time which is shorter than that after which the memorized information is completely erased, the total storage content is regenerated. For this purpose the control unit 11 directs the electron beam 14 at all storage elements 23, consecutively reading out the data they contain and immediately intensifying and reading them in again through the line unit 15.

When the external unit 10 requests the information be stored in a certain location, the electron beam 14 is directed to this exact location by means of a selector unit of the control unit 11 and the deflector unit 12 thus causing the insulation layer 25 here to become more conductive. The meter 40 now measures a certain voltage between the auxiliary electrode 27 and the conductive layer 21. The voltage depends on the state of polarization of the respective storage electrode 23. The voltages measured are of the order of magnitude of 100 mV. The information, expressed in the form of this voltage, is fed by conductor 41 to the desired external unit, e.g., a computer.

Since the input resistance of the meter 40 is not infinitely high, the existing polarization is slightly reduced through the read-out process. This reduction adds to that caused by Redox processes. To compensate for this reduction, the value read out by meter 40 can again be stored in the respective storage element at its full value by means of an intensifier 50 and the line unit 15.

Figure 3:
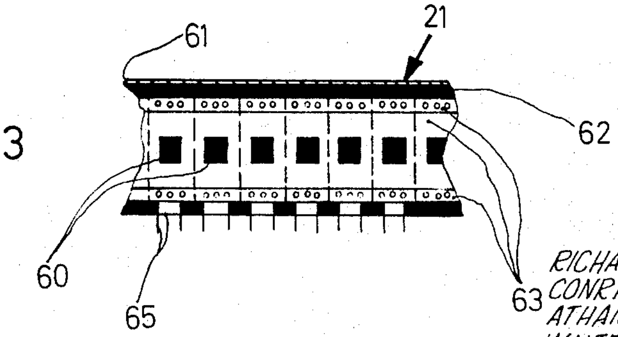
FIG. 3 shows a schematic view of a junction MOSFET.

FIG. 3 shows an embodiment of a junction contact 21 used to reverse the respective external source and output lines 10, 41 of the storage electrodes. This junction contact consists of a highly conductive layer 61, e.g., made of silver, one or more highly insulated layer(s) 62, e.g., made of metal oxides, and of doped, highly pure semiconductor layers 65, e.g., made of silicon.

One of these highly pure semiconductor layers 63 comprises several basic elements 60 which are all insulated from each other. Each of these basic elements 60 constitutes a metal oxide silicon field-effect transistor. The storage electrodes are identified by the numeral 65.

Figure 4:
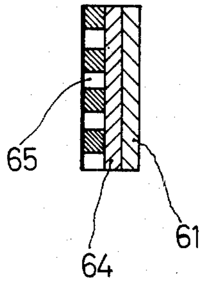
FIG. 4 shows an embodiment of the invention.

FIG. 4 shows another embodiment of a junction contact 21 which consists of a highly conductive layer 61 and a homogenous mosaic semiconductor layer 64 and is provided with a storage electrode arrangement 65. The conductivity of the layer can be modified by injecting electrons.

The embodiments of the invention in which an exclusive property or privilege is claimed are defined as follows:

1. Storage element for the electrochemical storage of large quantities of information comprising:

means defining a chamber;

electrolyte in said chamber means;

a plurality of spaced and separate chargeable polarizable electrode means arranged in said chamber means adjacent said electrolyte;

a single, nonpolarizable counter electrode means positioned in said chamber means and spaced from said plurality of polarizable electrode means and associated with each of said plurality of polarizable electrode means for energy supply;

controllable junction contact means arranged in electrical communication with said polarizable electrode means and adapted to transfer an electrical charge condition to said polarizable electrode means whenever said controllable junction contact means is subjected to external excitation; and auxiliary, nonpolarizable, electrode means in said electrolyte for detecting the magnitude of polarization on said polarizable electrode means.

2. A storage element according to claim 1 wherein said controllable junction contact means consists of a highly conductive layer, one or more highly insulating layer(s), and of highly pure doped semiconductor layers, one of which layers contains a multiplicity of insulated basic elements so that one individual element constitutes a MOSFET (metal-oxide silicon field-effect transistor).

3. A storage element according to claim 1, wherein said controllable junction contact means consists of a highly conductive layer, and a homogenous or mosaic semiconductor layer provided with a storage electrode arrangement.

4. A storage element according to claim 1, including a semiconductor layer arranged in electrical communication with said polarizable electrode means and adapted to transfer a charged condition to said polarizable electrode means; and wherein said controllable junction contact means comprises conductor layer means arranged in electrical communication with said semiconductor layer and adapted to transfer a signal applied thereto through said semiconductor layer to thereby control the nature of said charged condition.

5. A storage element according to claim 1, including a control unit responsive to externally applied information for selecting which one of said plurality of polarizable electrode means is to receive a charge condition; and further including a line unit responsive to externally applied information for applying digitized information to said controllable junction contact means to thereby control the nature of said charged condition.

6. A storage element according to claim 5, wherein said auxiliary electrode means in said electrolyte is provided for detecting the voltage difference between said auxiliary electrode means and said controllable junction contact means.

* * * * *